(12) United States Patent
Ohno (10) Patent No.: US 6,707,783 B2
(45) Date of Patent: Mar. 16, 2004

(54) OPTICAL RECORDING MEDIUM AND RECORDING/ERASING METHOD

(75) Inventor: Takashi Ohno, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/287,582

(22) Filed: Nov. 5, 2002

(65) Prior Publication Data

US 2003/0063542 A1 Apr. 3, 2003

Related U.S. Application Data

(63) Continuation of application No. PCT/JP02/01565, filed on Feb. 21, 2002.

(30) Foreign Application Priority Data

Mar. 6, 2001 (JP) .................................... 2001-062326
Nov. 26, 2001 (JP) .................................... 2001-358898

(51) Int. Cl.$^7$ ................................................ G11B 7/00
(52) U.S. Cl. .................. 369/275.1; 369/288; 369/59.12
(58) Field of Search ........................... 369/275.1, 275.2, 369/283, 288, 13.54, 13.38, 13.48, 13.5, 59.11, 59.12; 428/64.1–64.6, 913; 430/270.13, 495.1, 945, 940, 271.1, 273.1

(56) References Cited

U.S. PATENT DOCUMENTS

| | | | |
|---|---|---|---|
| 4,670,345 A | | 6/1987 | Morimoto et al. |
| 4,860,274 A | | 8/1989 | Kobayashi |
| 4,939,013 A | * | 7/1990 | Kimura et al. ............... 369/288 |
| 4,939,717 A | * | 7/1990 | Ohno et al. .................. 369/116 |
| 5,154,957 A | * | 10/1992 | Yamada et al. ............. 428/65.2 |
| 5,156,693 A | * | 10/1992 | Ide et al. ..................... 428/642 |
| 5,305,303 A | * | 4/1994 | Akahira et al. .......... 369/275.4 |
| 5,549,953 A | * | 8/1996 | Li ............................... 369/288 |
| 5,811,217 A | * | 9/1998 | Akahira et al. ............. 369/288 |
| 6,004,646 A | | 12/1999 | Ohno et al. |
| 6,096,399 A | * | 8/2000 | Yoshinari et al. ........... 369/288 |
| 6,143,468 A | | 11/2000 | Ohno et al. |
| 6,294,310 B1 | | 9/2001 | Ohno et al. |

FOREIGN PATENT DOCUMENTS

| | | | |
|---|---|---|---|
| JP | 60-179954 | | 9/1985 |
| JP | 61-258787 | | 11/1986 |
| JP | 1-251342 | | 10/1989 |
| JP | 07272319 A | * | 10/1995 |
| JP | 10329423 A | * | 12/1998 |

* cited by examiner

*Primary Examiner*—Thang V. Tran
(74) *Attorney, Agent, or Firm*—Oblon, Spivak, McClelland, Maier & Neustadt, PC

(57) ABSTRACT

An optical recording medium comprising a substrate and a phase-change type recording layer which may have at least two phases provided on the substrate, wherein the phase-change type recording layer has a composition represented by the following formula (1) as the main component:

$$(Au_xSb_{1-x})_{1-y}Ge_y \quad (1)$$

where x and y are numbers which satisfy $0.01 \leq x \leq 0.4$ and $0 < y \leq 0.3$.

7 Claims, 3 Drawing Sheets

OPTICAL RECORDING MEDIUM AND RECORDING/ERASING METHOD

CROSS REFERENCE TO RELATED APPLICATION

This is a Continuation Application of PCT Application No. PCT/JP02/01565, filed on Feb. 21, 2002, which was not published under PCT Article 21(2) in English. This application is based upon and claims the benefit of priority from the prior Japanese Patent Application Nos. 2001-062326, filed Mar. 6, 2001, and 2001-358898, filed Nov. 26, 2001 the entire contents of which are incorporated herein by reference.

TECHNICAL FIELD

The present invention relates to an optical recording medium having, for example, a rewritable phase-change type recording layer. Particularly, it relates to an optical recording medium having a phase-change type recording layer excellent in storage stability in a non-recorded state and in a recorded state, an optical recording medium having excellent jitter properties in recording at a high transfer rate, and a method of recording/erasing on it.

BACKGROUND ART

On an optical recording medium having a phase-change type recording layer, recording/retrieving/erasing is carried out by utilizing a change in the reflectivity accompanying a reversible change of the crystalline state. Among such optical information recording media, a phase-change type optical disc (the phase-change type optical disc will sometimes be referred to simply as a disc in the present specification) is being developed and used practically as a low cost large capacity recording medium excellent in portability, weather resistance, impact resistance, etc. For example, rewritable CD such as CD-RW has already been used widely, and rewritable DVD such as DVD-RW, DVD+RW, DVD-RAM is being on sale.

Used practically at present as a means for recording on a rewritable phase-change type recording material, is to utilize a reversible change between the crystal phase and the amorphous phase to let the crystalline state in a non-recorded/erased state and to form amorphous marks at the time of recording. Usually, the recording layer is heated to a temperature higher than the melting point and then rapidly cooled to form amorphous marks, and the recording layer is heated and kept at a temperature in the vicinity of the crystallization temperature for a certain time to obtain a crystalline state. Namely, in general, a reversible change between the stable crystal phase and the amorphous phase is utilized. As a material for such a phase-change type recording layer, a chalcogen type alloy thin film is used in many cases. For example, a GeSbTe type, InSbTe type, GeSnTe type or AgInSbTe type alloy may be mentioned.

However, in proportion to increase in the volume of information in recent years, an optical recording medium with which recording/retrieving at a higher speed is possible, has been desired. Further, excellent storage stability of recorded information i.e. that information recorded on an optical recording medium does not deteriorate and is stable even after long-term storage, is also one of important performances required for an optical recording medium. The present invention has been made to achieve such a demand, and it is an object of the present invention to provide an optical recording medium with which recording/erasing at a higher speed is possible and which has a high storage stability of recorded signals.

DISCLOSURE OF THE INVENTION

Namely, in accordance with an aspect of the present invention, there is provided an optical recording medium comprising a substrate and a phase-change type recording layer which may have at least two phases provided on the substrate, wherein the phase-change type recording layer has a composition represented by the following formula (1) as the main component:

$$(Au_xSb_{1-x})_{1-y}Ge_y \tag{1}$$

where x and y are numbers which satisfy $0.01 \leq x \leq 0.4$ and $0 < y \leq 0.3$.

By using a recording layer having as the main component, a composition wherein a small amount of Ge is added to a Au—Sb type alloy rich in Sb, an optical recording medium having a phase-change speed higher than that of a conventional optical recording medium can be obtained, and accordingly recording/erasing at a higher speed can be carried out. The reason is considered as follows. Namely, it is estimated that in the Au—Sb type alloy, a quasi-stable crystal phase exists in addition to an amorphous phase and a stable crystal phase. In a conventional phase-change recording medium, a phase-change between the stable crystal phase and the amorphous phase with a high activation energy is mainly employed, and accordingly the speed of the phase-change is inadequate and recording/erasing cannot be carried out at a high speed. Whereas, in the present invention, by effectively utilizing the quasi-stable crystal phase of the Au—Sb type alloy, it becomes possible to employ a phase-change between the quasi-stable crystal phase and the amorphous phase with an activation energy smaller than the activation energy between the stable crystal phase and the amorphous phase for recording/erasing, whereby a higher phase-change speed can be achieved.

According to another aspect of the present invention, there is provided a method of recording/erasing on the above-mentioned optical recording medium having a recording layer having a predetermined Au—Sb type alloy composition as the main component in which the two different phases of said phase-change type recording layer are utilized as a recorded state and a non-recorded/erased state, respectively, wherein said phase-change type recording layer may have at least three phases of a phase A, a phase B and a phase C, and when the phase B is more stable than the phase A and the phase C is more stable than the phase B, said phase B is utilized as the recorded state or the non-recorded/erased state. In the present invention, it is defined that the phase B is more stable than the phase A when a phase change from the phase A to the phase B can take place at a lower temperature than a phase change from the phase B to the phase A.

According to another aspect of the present invention, there is provided a method of recording/erasing information signals on the above-mentioned optical recording medium having a recording layer having a predetermined Au—Sb type alloy composition as the main component, only at a reference clock period T of at most 15 nsec, wherein for recording, a high power laser pulse and a low power laser pulse are alternately irradiated, and said low power laser pulse includes a pulse with a pulse width of at least 0.9T.

BEST EMBODIMENT FOR CARRYING OUT THE INVENTION

Now, the present invention will be explained in further detail.

(A) Optical Recording Medium (A-1) Composition of the Recording Layer

The optical recording medium of the present invention is an optical recording medium comprising a substrate and a phase-change type recording layer which may have at least two phases provided on the substrate, wherein the phase-change type recording layer has a composition represented by the following formula (1) as the main component:

$$(Au_xSb_{1-x})_{1-y}Ge_y \quad (1)$$

where x and y are numbers which satisfy $0.01 \leq x \leq 0.4$ and $0 < y \leq 0.3$. In the present invention, in a case where "the recording layer has a predetermined composition a as the main component", it means that the above predetermined composition a is contained in an amount of at least 50 atomic % of the entire recording layer.

Figure 3:
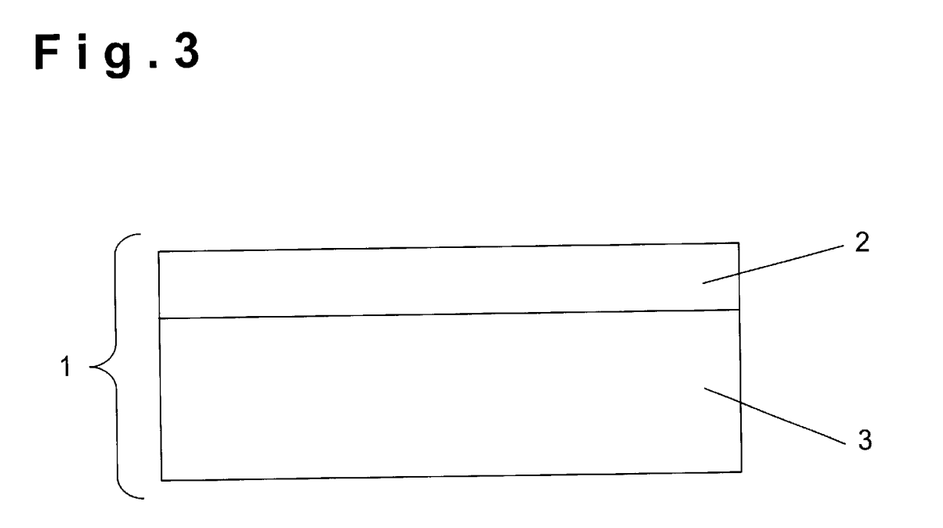
FIG. 3: a schematic view illutrating an optical recording medium including a phase-change type recording layer.

FIG. 3 shows an optical recording medium 1 including a phase-change type recording layer 2 having two phase provided on a subtrate 3.

In the present invention, by using a composition having the above predetermined composition as the main component for the recording layer of the optical recording medium, an optical recording medium providing a high phase-change speed and excellent in storage stability can be obtained.

In the present invention, as the quasi-stable crystal phase of the Au—Sb type alloy is utilized when recording/erasing is carried out on the optical recording medium, it is required that the quasi-stable crystal phase is formed stably. In order to form the quasi-stable crystal phase stably, x is at least 0.01 in the above-mentioned formula (1). The storage stability of the above quasi-stable crystal phase further improves when the Au content is high, and accordingly x is preferably at least 0.02, more preferably at least 0.05, particularly preferably at least 0.12, and most preferably at least 0.20. When the Au content is increased, an optical recording medium wherein the reflectivity in the quasi-stable crystal phase does not substantially change even when a long time passes can be obtained. On the other hand, although the Au content is preferably high from the viewpoint of the storage stability of the quasi-stable crystal phase, the higher the Au content, the slower the phase-change speed from the amorphous phase to the quasi-stable crystal phase tends to be. Further, if the Au content is too high, the stable crystal phase of the Au—Sb type tends to be always formed, and the amorphous phase and the quasi-stable crystal phase tend not to exist stably. Accordingly, in the present invention, the upper limit of x is 0.4. Preferably, x is at most 0.35, more preferably at most 0.30. Within this range, the balance between the storage stability of the quasi-stable crystal phase and the phase-change speed will be more favorable.

Namely, when the Au—Sb ratio is within the above-mentioned range, a quasi-stable crystal state with excellent storage stability can be obtained. Further, within this range, as the phase-change speed from the amorphous phase and the quasi-stable crystal phase to the stable crystal phase is low, recording by the phase-change between the quasi-stable crystal phase and the amorphous phase becomes possible.

In the present invention, by incorporating Ge into the Au—Sb type alloy, the amorphous phase tends to be formed easily, and the stable phase-change between the quasi-stable crystal phase and the amorphous phase becomes possible. Accordingly, it is required that Ge is contained in an amount larger than 0 in the Au—Sb type alloy used in the present invention. Further, as the Ge content is high, the amorphous phase tends to exist more stably, and accordingly y is preferably at least 0.01, more preferably at least 0.03, in the composition of the above-mentioned formula (1). On the other hand, if the Ge content is too high, the phase-change speed from the amorphous phase to the quasi-stable crystal phase tends to be slow, and accordingly y is at most 0.3. However, in order to achieve a higher crystallization speed (phase-change speed from the amorphous phase to the quasi-stable crystal phase), y is preferably at most 0.28, more preferably at most 0.15.

In general, recording/erasing is carried out by irradiating light beam (laser) spot emitted from a light irradiation portion to the recording layer while rotating the medium at a high speed, while relatively moving the light irradiation portion and the medium at a high speed. A case where the relative movement speed is high is referred to as "the recording linear velocity is high", and a case where the relative moving speed is low is referred to as "the recording linear velocity is low".

In a state where the recording linear velocity is high, the recording layer is once heated by the light beam spot, and then rapidly cooled. Namely, the temperature history of the recording layer is quenchwise, and among recording layers having the same composition, the amorphous phase is likely to be formed and the crystal phase is less likely to be formed when the recording linear velocity is high.

The above-mentioned Au—Sb composition employed in the present invention has such an advantage that the optical recording medium can be designed corresponding to the aimed recording linear velocity, since the stability of the amorphous phase and the phase-change speed from the amorphous phase to the quasi-stable crystal phase can be controlled by adjusting the Ge content. Namely, in a medium wherein the aimed recording linear velocity is high, Ge should be incorporated in a small amount, and in a medium wherein the aimed recording linear velocity is low, Ge should be incorporated in a large amount.

As mentioned above, the Au—Sb composition employed in the present invention has such an advantage that the storage stability and the phase-change speed from the amorphous phase to the quasi-stable crystal phase can be freely controlled by adjusting the Au content and the Ge content. This is estimated to be because the recording/erasing mechanism of the optical recording medium of the present invention wherein the above-mentioned Au—Sb composition is employed for the recording layer has the following two embodiments.

A first embodiment is that the quasi-stable crystal phase is utilized as a non-recorded/erased state, and amorphous phase marks are formed at the time of recording. By effectively utilizing this embodiment, an optical recording medium on which a high speed recording/erasing is possible can be obtained.

On the other hand, a second embodiment is such that the quasi-stable crystal phase is utilized as a non-recorded/erased state, amorphous phase marks are formed at the time of recording, and then the marks transit to the stable crystal phase. By effectively utilizing this embodiment, an optical recording medium particularly excellent in storage property can be obtained.

Now, specific examples of an optical recording medium employing the first embodiment and an optical recording medium employing the second embodiment will be explained in (I) and (II), respectively.

(I) Optical Recording Medium Employing the First Embodiment

In the Au—Sb composition employed in the present invention, the Ge content is one factor which controls the phase-change speed from the amorphous phase to the quasi-stable crystal phase, and accordingly recording/erasing effectively utilizing the first embodiment becomes possible by controlling the Ge content.

Further, it is also possible to carry out recording/erasing effectively utilizing the first embodiment by controlling the Au content. In this case, the overwriting jitter properties at a high transfer rate recording tend to improve. Specifically, $0.05 \leq x$ in the above-mentioned formula (1).

When the overwriting jitter properties at a high transfer rate improve, an optical recording medium which can be used even in a case where recording/erasing of information signals is carried out only at a reference clock period T of at most 15 nsec can be obtained. More specifically, an optical recording medium which can be favorably used in a case where recording/erasing of information signals is carried out only at a reference clock period T of at most 15 nsec, even in such a recording/erasing method that a high power laser pulse and a low power laser pulse are alternately irradiated for recording, and said low power laser pulse includes a pulse with a pulse width of at least 0.9T, can be obtained.

In a case where a high power laser pulse and a low power laser pulse are alternately irradiated (such a recording method will sometimes be referred to as "divided pulse method" in the present specification) to a part where marks are to be formed, it is required that said low power laser pulse is long so as to obtain an adequate cooling rate. Accordingly, the low power laser pulse preferably includes one longer than 0.9T, where T is the reference clock period. Here, the method of recording/erasing on the optical recording medium of the present invention will be explained in detail in the following (B).

(II) Optical Recording Medium Utilizing the Second Embodiment

In the optical recording medium of the present invention, depending upon the composition of the recording layer, such as a case where the Au amount in the recording layer is large, such a phenomenon that the amorphous phase gradually undergoes a phase-change to the stable crystal phase is observed in some cases. The second embodiment is to utilize the above phenomenon such that after the amorphous phase marks are formed, the marks undergo the phase-change into the stable crystal phase. Within the range of the composition of the recording layer used for the optical recording medium of the present invention, the reflectivity in the amorphous phase and the reflectivity in the stable crystal phase are at the same level. Accordingly, even when the amorphous phase changes into the stable crystal phase, it is possible to retrieve signals. On the contrary, by the change of the recording marks into the stable crystal phase, the storage properties of the optical recording medium will significantly improve. Further, even in such a recording layer composition wherein the Ge content is small and the amorphous phase is slightly unstable, the recording marks will not disappear when the above-mentioned second embodiment is utilized.

In order to obtain an optical recording medium utilizing the second embodiment, the values of x and y are preferably $0.12 \leq x \leq 0.4$ and $0.01 \leq y \leq 0.3$ in the above-mentioned formula (1).

Here, the amorphous phase (amorphous marks) is erased (phase-change to the quasi-stable crystal phase) by heating the recording layer and keeping it at a temperature in the vicinity of the crystallization temperature for a predetermined time. On the other hand, in order that the stable crystal phase (stable crystal marks) is erased (phase-change to the quasi-stable crystal phase), the recording layer is required to be once melted. Accordingly, in order to utilize the above-mentioned stable crystal marks for recording, the power (erasing power) of light beam irradiated for erasing marks should be increased to a level at which the recording layer is melted.

Accordingly, in the present invention, as the phase-change type recording layer composition is $(Au_xSb_{1-x})_{1-y}Ge_y$ wherein $0.01 \leq x \leq 0.4$ and $0 < y \leq 0.3$, a medium excellent in balance between the recording signal storage stability and jitter properties at a high transfer rate overwriting recording can be obtained. Further, within the above-mentioned composition range, the crystallization speed (phase-change speed from the amorphous phase to the quasi-stable crystal phase) can be made adequately high. Further, within the above-mentioned composition range, an optical recording medium excellent in uniformity in the reflectivity of read signals (uniformity in the reflectivity when a read signal shape is observed by an oscilloscope) can also be obtained.

In an optical recording medium wherein the crystal phase of the recording layer is not uniform, the reflectivity level in the crystal phase (non-recorded state) is not constant. Accordingly, the read signal shape as observed by an oscilloscope of such an optical recording medium is a bold line with a width. This is estimated to be because at least two types of phases having different reflectivities are mixed in such a state that they are not adequately uniform relative to the beam irradiation area. Such a phenomenon is remarkable in high linear velocity recording at a reference clock period of at most 15 nsec (nanosecond). However, within the range of the composition of the recording layer used for the optical recording medium of the present invention, even in a case of a composition for a high crystallization speed corresponding to high linear velocity recording wherein the reflectivity level is unstable, the read signal shape as observed by an oscilloscope is a sharp thin line. This means nothing but in the optical recording medium of the present invention, the quasi-stable crystal phase will not be non-uniform, and the reflectivity level is constant.

Therefore, according to the present invention, an optical recording medium suitable for high linear velocity recording can be obtained. Particularly, an optical recording medium suitable for high linear velocity recording/erasing, on which recording/erasing of recording signals can be carried out only at a reference clock period T of at most 15 nsec, can be obtained. Further, by employing recording conditions applicable to the crystallization speed of the above optical recording medium (divided pulse recording method of light beam (laser), pulse strategy), practical high linear velocity recording can be carried out.

(A-2) Preferred Composition of the Recording Layer

A preferred embodiment of the recording layer of the optical recording medium is that the phase-change type recoding layer has a composition represented by the following formula (2) as the main component:

$$((Au_xSb_{1-x})_{1-y}Ge_y)_{1-z}M2_z \tag{2}$$

where x, y and z are numbers which satisfy $0.01 \leq x \leq 0.4$, $0 < y \leq 0.3$, $0 \leq z \leq 0.4$, and M2 is at least one element selected from Te, In and Sn.

With respect to the optical recording medium employing a recording layer composition wherein Ge is further incorporated into the Au—Sb type alloy, when further improvement in performances is required, it may be difficult to satisfy both overwriting jitter properties at a high transfer rate recording and stability of the quasi-stable crystal phase in some cases. In such a case, both the above-mentioned jitter properties and the above-mentioned stability may be satisfied by not only further incorporating Ge but also further incorporating element M2 into the Au—Sb type alloy, whereby an optical recording medium having more favorable performances can be obtained. Particularly, an optical recording medium on which recording/erasing of recording signals can be carried out only at a reference clock period T of at most 15 nsec, can favorably be obtained.

The content of M2 in the above-mentioned formula (2) is not limited so long as it is at least 0, and its upper limit is at most 0.4.

By use of the addition element M2, it becomes easy to satisfy both overwriting jitter properties at a high transfer rate recording of the optical recording medium and stability of the quasi-stable crystal phase, and depending upon the type of the addition element used as M2, the above-mentioned effect may further be increased. Specific examples of such an addition element will be explained below.

When Te is used as the above element M2, the transition speed from the amorphous phase and the quasi-stable crystal phase to the stable crystal phase tends to be slow. Accordingly, stability of the quasi-stable crystal phase tends to further increase, whereby storage stability of the recorded signals is further increased.

Namely, when the Au amount is large within the composition range of the present invention, as explained in the above-mentioned (II), a phenomenon such that the amorphous phase and the quasi-stable crystal phase gradually undergo a phase-change to the stable crystal phase tends to easily take place depending upon the recording layer composition employed. This phenomenon is preferred in such a view that the stability of the recording marks further improves, as explained in the above-mentioned (II), whereas, as a result of improvement in the stability of the recording marks, it is required to increase the power of the erasing beam to erase the recording marks. To increase the erasing power (beam output) itself is not so difficult, however, if the width of increase of the beam output is extremely large, the life of the erasing beam tends to be short in some cases. Accordingly, in such a case, it is most preferred to employ such a recording layer composition that the stability of the amorphous phase and the quasi-stable crystal phase is adequately high, and the above-mentioned phase-change to the stable crystal phase will not take place. From such a viewpoint, further addition of Te to a composition comprising the Au—Sb type alloy and Ge incorporated thereinto is an extremely preferred embodiment. Further, the phase-change from the amorphous phase or the quasi-stable crystal phase to the stable crystal phase can be suppressed by addition of Te, whereby such an advantage arises that the Au content can further be increased in the above-mentioned formula (2).

The effect of the above-mentioned suppression of the phase-change is remarkable when $0.01 \leq z$ in the above-mentioned formula (2), and the higher the Te content, the higher the effect. On the other hand, if the Te content is too high, the amorphous phase may undergo a phase-change to the quasi-stable crystal phase during a long-term storage in some cases.

Namely, if the Te content is low, the amorphous phase tends to undergo a phase-change to the stable crystal phase, and if the Te content is high, the phase-change to the stable crystal phase is less likely to take place, and the amorphous phase may undergo a phase-change to the second stable quasi-stable crystal phase instead in some cases.

Accordingly, if the Te content is too high, in a case where the non-recorded state is in the quasi-stable crystal phase, such a phenomenon may take place that the recording marks disappear by the phase change of the amorphous marks to the quasi-stable crystal phase in some cases. Accordingly, from such a viewpoint, when Te is incorporated, z is required to be at most 0.4, and it is preferably at most 0.2, more preferably at most 0.1.

Here, in the above-mentioned formula (2), when the Ge amount is large, stability of the amorphous marks can be increased, and as mentioned above, the phase-change from the amorphous phase to the stable crystal phase can be suppressed. However, both Te and Ge, if their contents are high, tend to lower the phase-change speed (crystallization speed) from the amorphous phase to the quasi-stable crystal phase at the time of recording/erasing. Accordingly, the crystallization speed may be inadequate in some cases if both the Te content and the Ge content are increased simultaneously, and thus it is required to adequately consider a increase of the Ge content when the Te content is high, from the viewpoint to keep appropriate phase-change speed. In order to improve storage stability of the amorphous marks considering balance with the Ge content, the Te content is preferably at most 0.10, more preferably at most 0.08.

Further, by use of Te as the above-mentioned element M2, such an effect that signal properties of the optical recording medium used in the present invention improve may also be obtained. Namely, when the optical recording medium is stored for a long period of time, the marks in the stable crystal phase broaden, that is, the quasi-stable crystal phase around the marks undergoes a phase-transition to the stable crystal phase, and signal properties may impair in some cases. Te lowers the transition speed from the amorphous phase and the quasi-stable crystal phase to the stable crystal phase, and accordingly this tendency can be decreased by addition of Te.

In the present invention, In may also be used as the above element M2. When In is used as the above element M2, the non-recorded part of the recording layer is considered to consist of a mixed phase of In—Sb type and Au—Sb type quasi-stable crystal phases, and accordingly it is required to adjust the total content of Au and In within an appropriate range, in order to form the above mixed phase. If the total content of Au and In is too low, formation of this phase tends to be inadequate. On the other hand, if the total content of Au and In is too high, the In—Sb type and Au—Sb type stable crystal phases tend to be always formed, and phases corresponding to the amorphous phase and the quasi-stable crystal phase may not exist stably, and function as a recording medium may not be obtained in some cases. Further, if the content of In or Au is high, the crystallization speed tends to be low, whereby if the total content of Au and In is too high, the amorphous marks may not be erased in some cases.

Accordingly, when In is used as the above element M2, in the recording layer composition in the above-mentioned formula (2), the total amount of Au and In is preferably from 5 to 50 atomic %, more preferably from 10 to 45 atomic % based on the entire composition. Specifically, the total content of Au and In may be controlled to achieve the above-mentioned content by adjusting the values of x and z in the above-mentioned formula (2).

When In is used as the above element M2, in the same manner as in the case of using Te, the transition speed from the amorphous phase and the quasi-stable crystal phase to the stable crystal phase tends to be low. Accordingly, the phase change of the quasi-stable crystal phase to the stable crystal phase can be suppressed, whereby stability of the quasi-stable crystal phase increases, and as a result, storage stability of recorded signals further increases.

This is estimated to be because the recording layer is in such a state that the In—Sb type alloy and the Au—Sb type alloy are mixed as mentioned above, by use of In. The reason why the amorphous phase and the quasi-stable crystal phase are less likely to undergo the phase-change to the stable crystal phase when the In—Sb type alloy and the Au—Sb type alloy are mixed is not necessarily clear, however, it is considered that the phase-change speed becomes low, or the stable crystal phase is not the most stable phase any more by addition of In. For example, there is possibility that the phase corresponding to the quasi-stable crystal phase in the recording layer before addition becomes the most stable phase at a temperature in the vicinity of room temperature by addition of In.

Accordingly, when In is used as the above element M2, the value of z in the above-mentioned formula (2) is required to be at least 0, and it is preferably at least 0.03, more preferably at least 0.05. Whereas, it is required to be at most 0.4, and it is preferably at most 0.35, more preferably at most 0.3.

With the In—Sb type alloy or the Au—Sb type alloy alone, if the In amount or the Au amount is large, the stable crystal phase is likely to be always formed, and the quasi-stable crystal phase may not exist stably. Whereas, in the present invention, In is added to the AuSbGe type composition, whereby the phase-change of the amorphous phase and the quasi-stable crystal phase to the stable crystal phase is less likely to take place, and accordingly such an effect may also be obtained that the range of the Sb content to be contained in the recording layer widens by appropriately adjusting the In and Au contents.

Here, in the present invention, at least part of In may be replaced with Ga. This is because the functions of In and Ga are equal in the recording layer composition.

In the above formula (2), when Sn is selected as the element M2, the storage stability of the quasi-stable crystal phase of the Au—Sb type alloy becomes particularly high. Namely, of the Au—Sb type material, the quasi-stable crystal phase is not adequately stable, and the reflectivity of the recording layer may decrease during the long-term storage in some cases (it is considered that the reflectivity may increase depending upon the multi layer structure). This means that intensity of the recorded signals may decrease during the long-term storage, with respect to recording by the phase-change between the amorphous phase and the quasi-stable crystal phase. Further, the decrease of the reflectivity of the recording layer also means that the signal quality deteriorates due to a difference between the reflectivity at a region where the amorphous phase is crystallized at the time of rewriting and the reflectivity at an originally crystallized region. Accordingly, in a case where the stability of the quasi-stable crystal phase is not adequate due to the recording layer composition, Sn may be used as the element M2.

Namely, in the present invention, by adding Sn to the Au—Sb type alloy, change with time of the reflectivity in the quasi-stable crystal phase in the Au—Sb type can be suppressed. The reason why the reflectivity in the quasi-stable crystal phase in the Au—Sb type changes with time is not necessarily clear. Within the composition range of the present invention, the phase-change to the stable crystal phase is likely to take place when the Au amount is large, however, considering that the decrease in the reflectivity tends to be significant when the Au amount is small, there is such a possibility that the reason of the decrease in the reflectivity is change in crystal orientation in the quasi-stable crystal for example, not a gradual phase-change to the stable crystal phase. In any case, it is considered that a gradual change to a state which is more stable than the state immediately after crystallization takes place. Accordingly, it is considered that by addition of Sn, the speed of this change becomes low, or the state after the change with time of the quasi-stable crystal phase of the Au—Sb type alloy does not exist stably.

Accordingly, if the Sn content is too low, the effect of suppressing the change of the reflectivity with time is inadequate, and if it is too high, the difference in the reflectivity between the crystal and the amorphous tends to be small, whereby the signal intensity may be inadequate.

Accordingly, in the above-mentioned formula (2), the value of z when Sn is used as the element M2 is $0 \leq z$, preferably $0.1 \leq z$, more preferably $0.15 \leq z$. On the other hand, the value of z is $z \leq 0.4$, preferably $z \leq 0.35$, more preferably $z \leq 0.3$.

Further, when Sn is added, the crystallization speed from the amorphous phase to the quasi-stable crystal phase tends to be high, whereby crystallization at a higher linear velocity becomes possible. Further, by addition of Sn, it tends to be easy to form crystal nuclei, whereby recording by forming crystal phase marks by irradiating laser light to the amorphous phase in a as-deposited state formed by e.g. a sputtering method becomes possible.

(A-3) Other Matters Regarding the Recording Layer

In the present invention, with a purpose of improving various properties, Al, Ag, Ga, Zn, Si, Cu, Pd, Pt, Pb, Cr, Co, O, N, S, Se, V, Nb or Ta may, for example, be added to the recording layer as the case requires. In order to obtain an effect to improve properties, the addition amount is preferably at least 0.1 at. % (atomic %) based on the entire composition of the recording layer. However, it is preferably at most 10 at. % so as to obtain particularly preferred properties of the composition of the present invention.

The layer thickness of the above-mentioned recording layer is preferably 5 nm or more in order to obtain a sufficient optical contrast, and to increase a crystallization speed to achieve recording/erasing in a shorter time. Further, the thickness is more preferably 10 nm or more for a purpose of increasing the reflectivity to be sufficiently high.

On the other hand, it is preferable that the layer thickness of the recording layer is 100 nm or less in order to prevent the occurrence of cracks and to obtain a sufficient optical contrast.

More preferably, it should be 50 nm or less in order to reduce the thermal capacity and to increase the recording sensitivity. Further, the reduced thickness makes the volume change due to a phase change small, and makes the influence of a repetitive volume change by repetitive overwriting to the recording layer itself and the protective layers sandwiching the recording layer small. Further, it suppresses the accumulation of an irreversible microscopic deformation to thereby reduce noises and improves the durability to the repetitive overwriting.

In a medium for high density recording such as a rewritable DVD, the thickness of the recording layer is more preferably 30 nm or less because requirements of reducing noises are more severe.

Here, with respect to phase-change recording utilizing the quasi-stable crystal phase of the Au—Sb type alloy, one utilizing a phase-change to the stable crystal phase has been known. For example, U.S. Pat. No. 4,860,274 discloses that recording/erasing is carried out between different two types of crystal phases i.e. the quasi-stable crystal phase and the stable crystal phase with respect to a Au—Sb alloy having a Sb content of from 5 to 25% or a Au—Sb alloy having a Sb content of from 70 to 90 atomic %. Further, JP-A-63-225933 discloses that in an alloy recording layer containing Sb and Au as the main components with a ratio of the number of atoms of Sb to Au of from 4:1 to 1:1, and containing at least one element selected from the group consisting of Se, Bi, As, Te and Zn in an amount of from 2 to 50 atomic %, a π phase of the quasi-stable crystal phase is obtained by rapid cooling after melting, and a stable crystal phase is obtained by annealing the quasi-stable crystal phase.

However, in such a Au—Sb type alloy as disclosed in these publications, as the quasi-stable crystal phase exists relatively stably, and the phase-change speed between the quasi-stable crystal phase and the stable crystal phase is low, recording/erasing at a high speed is difficult. Further, it is proven that the Au—Sb type alloy in the above-mentioned publications is unsuitable for recording/erasing at a high speed also by that static recording alone is carried out in these publications. Further, there is such a problem that these compositions are not so stable that the stability of the quasi-stable crystal phase may not secure the stability of the recording signals.

On the other hand, the present inventor has found that even when a Au—Sb type alloy is used, an optical recording medium in which the phase-change speed is high and the stability of the quasi-stable crystal phase is adequate can be obtained by adding Ge to the Au—Sb type alloy. This is because the amorphous phase tends to be easily formed by addition of Ge, whereby the phase-change between the quasi-stable crystal phase and the amorphous phase at a high speed becomes possible.

Here, JP-A-1-251342 discloses a composition similar to the recording layer composition of the optical recording medium used in the present invention.

However, in the recording layer composition as disclosed in this publication, the range of the Ge content is so broad as from 5 to 80 at. %, whereas the amount of Ge to be contained in the Au—Sb type alloy composition used in the present invention is 30 at. % at the most. The reason why the Ge content is 30 at. % at the most in the present invention is that if the Ge content is higher than 30 at. %, the phase-change speed from the amorphous phase to the quasi-stable crystal phase decreases, and recording at a high linear velocity tends to be difficult. This is proven by that in Comparative Example 3 as described hereinafter, if the Ge content is 32 at. %, use as a phase-change type optical disc tends to be difficult at any linear velocity of from 1.2 to 24 m/s. Whereas, the Ge content in the recording layer composition as specifically disclosed in the above publication is 47 at. % in Example 2 (as calculated from the composition of $(Ge_{55}Sb_{45})_{85}Te_{10}Au_5)$) and 35 at. % in Examples 3 and 4 (as calculated from the composition of $(Ge_{50}Sb_{50})_{70}Te_{30})$). Namely, these values are higher than 30 at. % which is the allowable range in the present invention, and the recording layer composition as disclosed in the above publication is a recording layer composition unsuitable for high speed recording. Whereas, the optical recording medium of the present invention employs the quasi-stable crystal phase in the Au—Sb type alloy composition which is not disclosed or suggested in the above publication. Further, the optical recording medium of the present invention provides an exceptional effect such that high speed recording becomes possible as compared with the optical recording medium as disclosed in the above publication, by controlling the amount of Ge contained in the recording layer.

(A-3) Layers Other Than the Recording Layer

Now, the other portions in the structure of the phase-change optical disc will be explained. The phase-change optical disc comprises a substrate, and a protective layer, a recording layer, a protective layer and a reflective layer in this order or in the opposite order on the substrate in many cases.

As the substrate, a resin such as polycarbonate, polyacrylate or polyolefin or glass may, for example, be used. In a case where recording and retrieving light is incident from the substrate side, the substrate is required to be transparent to the recording and retrieving light.

In many cases, both surfaces of the recording layer are covered with protective layers. As a material for the protective layer, a dielectric material is used in many cases, and the dielectric material is determined in consideration of refractive index, thermal conductivity, chemical stability, mechanical strength, adhesion properties and so on. Generally, an oxide, a sulfide or a nitride of a metal or a semiconductor material having a high transparency and a high melting point, or a fluoride of Ca, Mg, Li or the like, may be used as the dielectric material.

These oxide, sulfide, nitride and fluoride are not always necessary to have a stoichiometric composition. It is effective to control the composition to adjust the refractive index and so on, and to use a mixture of these materials. More specifically, a mixture of a heat resistant compound such as an oxide, a nitride or a carbide and ZnS or a sulfide of rare earth may be used. For example, a mixture of ZnS and $SiO_2$ is often used for a protective layer of a phase-change type optical disc. It is desirable that the layer density of such a protective layer is 80% or more of a bulk state from the viewpoint of the mechanical strength.

The layer thickness of the protective layer is preferably 5 nm or more so that there is obtainable a sufficient anti-deformation effect to the recording layer and it functions as the protective layer. On the other hand, in order to reduce an inner stress of the dielectric material itself constituting the protective layer and to minimize the difference of elasticity of the layers in contact with this, and to prevent the occurrence of cracks, the layer thickness is preferably 500 nm or less.

Generally, a material constituting the protective layer has a low deposit rate, whereby the deposit time for the protective layer tends to be long. In order to reduce the deposit time to shorten a time for manufacturing and save the cost, it is preferable to control the layer thickness of the protective layer to be 200 nm or less. The layer thickness of the protective layer is more preferably 150 nm or less.

It is preferable that the layer thickness of the protective layer formed between the recording layer and the reflective layer is 5 nm or more in order to prevent the deformation of the recording layer. Generally, a microscopic plastic deformation is accumulated in the protective layer by repetitive overwriting. The microscopic plastic deformation causes scattering of light for retrieving to increase noises. Accordingly, in order to prevent the microscopic plastic deformation, it is preferable to form the protective layer in a thickness of 60 nm or less.

On the other hand, the layer thickness of the protective layer formed between the recording layer and the substrate is preferably 20 nm or more in order to protect the substrate.

The thickness of each of the recording layer and the protective layer is selected so as to provide good laser light absorbing efficiency and to increase the amplitude of recording signals, i.e., the contrast between a recorded state and a non-recorded state in consideration of an interfering effect caused by a multilayer structure, in addition to restrictions from the mechanical strength and reliability.

The reflective layer comprises preferably a material having high reflectivity and thermal conductivity. As the material having high reflectivity and thermal conductivity, a metal containing Ag, Au, Al, Cu or the like as the main component may be mentioned. Among these, Ag has the highest reflectivity and thermal conductivity as compared with Au, Al, Cu or the like.

Since Au, Cu or Al is apt to absorb light when they are used for the reflective layer in comparison with Ag in a case of light having a short wavelength. Accordingly, it is particular preferable to use a metal containing Ag as the main component for the reflective layer when laser having a short wavelength of 650 nm or less is used for recording/retrieving. Further, Ag is preferably used as a material for the reflective layer because the price as a target for sputtering is relatively low, a stable electric discharge is obtainable and the deposit speed is high, and it is stable in air.

Ag, Al, Au, Cu or the like may contain another element. When an impurity is mixed with these metals, the thermal conductivity and the reflectivity decrease, on the other hand, the stability and the smoothness of the layer surface may be improved in some cases. Accordingly, another element may be contained in an amount of about 5 at. % or less in the reflective layer. The element contained is preferably at least one element selected from the group consisting of Cr, Mo, Mg, Zr, V, Ag, In, Ga, Zn, Sn, Si, Cu, Au, Al, Pd, Pt, Pb, Ta, Ni, Co, O, Se, V, Nb, Ti, O and N.

The layer thickness of the reflective layer is preferably 50 nm or more in order to obtain sufficient reflectivity and heat radiation effect. On the other hand, the layer thickness of the reflective layer is preferably 200 nm or less in order to decrease a stress in the layer. Further, the layer thickness of the reflective layer is preferably 200 nm or less with a purpose of reducing the deposit time to shorten a time for manufacturing and save the cost also.

The recording layer, protective layer, reflective layer and the like are formed by e.g. a sputtering method in accordance with a conventional method employing alloy targets in a predetermined proportion. The layer formation of the recording layer, protective layer, reflective layer or the like is carried out preferably by placing each target for sputtering in an in-line device located in the same vacuum chamber because the oxidation and contamination by adjacent layers can be prevented. Further, such method is advantageous in productivity.

A protective coat layer comprising an ultraviolet-curing resin or the like may be formed on these layers for protection. Further, at least two recording layers may be formed on the substrate to increase the storage capacity, or after these layers are formed on the substrate, they may be bonded to one another with an adhesive.

Here, another layer other than the above-described layers may also be formed as the case requires.

(B) Method of Recording/Erasing on the Optical Recording Medium

Now, the method of recording/erasing on the optical recording medium of the present invention will be explained.

The above recording/erasing method is a recording/erasing method in which two different phases of the phase-change type recording layer of the above-described optical recording medium are utilized as a recorded state and a non-recorded/erased state, respectively, wherein when said phase-change type recording layer may have at least three phases of a phase A, a phase B and a phase C, and the phase B is more stable than the phase A and the phase C is more stable than the phase B, said phase B is utilized as the recorded state or the non-recorded/erased state.

Namely, the recording/erasing has conventionally been carried out by the phase-change between the most stable phase C and the most unstable phase A, however, in the present invention, the quasi-stable phase B in the medium having a recording layer of the above-mentioned composition can be used for the recording/erasing, whereby recording/erasing at a high speed becomes possible. The phase B may be in a non-recorded/erased state or in a recorded state.

In general, when the stability of the phase A, phase B and phase C, which the composition of the recording layer may have, is such that phase A<phase B<phase C, i.e. the stability increases in the order of the phase A, phase B and phase C, the most unstable phase A is in the amorphous phase (non-crystal phase), and the other phases B and C are in the crystal phase. Accordingly, it is common to consider that the phase A is in the amorphous phase, the phase B is in the quasi-stable crystal phase, and the phase C is in the stable crystal phase.

Whether each phase is in the amorphous phase or in the crystal phase, and which crystal phase they are in a case of the crystal phase, can be confirmed by observing a diffraction pattern of the recording layer by means of X-ray diffraction method or electron diffraction method.

Preferably, at least the phase A is in a recorded state and the phase B is in a non-recorded/erased state, or the phase A is in a non-recorded/erased state and the phase B is in a recorded state. Namely, recording/erasing is carried out by the phase-change between the phase A (amorphous phase) and the phase B (quasi-stable crystal phase). Accordingly, as described above, a phase-change speed higher than that of a conventional method wherein recording/erasing is carried out by the phase-change between the amorphous phase and the stable crystal phase can be obtained, and recording/erasing at a higher speed becomes possible.

The quasi-stable crystal phase may be in a non-recorded/erased state and amorphous phase marks are formed at the time of recording, or the amorphous phase may be in a non-recorded/erased state and quasi-stable crystal phase marks are formed at the time of recording. Further, the quasi-stable crystal phase may be in a non-recorded/erased state and amorphous phase marks are formed at the time of recording, which further undergo phase transition to the stable crystal phase.

Now, an explanation will be made with reference to an example wherein the quasi-stable crystal phase is in a non-recorded/erased state, and amorphous phase marks are formed at the time of recording.

In general, recording tracks are formed in a spiral or in the form of concentric circles on a disc-shape medium, and information are recorded along the recording tracks. Light beam (laser) spot emitted from a light irradiation portion is irradiated to the recording layer while rotating the medium at a high speed, and recording/retrieving/erasing is carried out while relatively moving the light irradiation portion and the medium at a high speed.

Light emitted from a light source usually passes through an objective lens via various optical systems and is irradiated to the medium. To move the light irradiation portion relatively to the medium is to irradiate light to the recording track of a disc-shape medium from an objective lens while rotating the medium in a state where the objective lens is substantially fixed, for example. In a case where the recording track is formed in a spiral on the medium, the objective lens is gradually moved in a disc radius direction while rotating the medium.

Firstly, in order to form an amorphous phase, it is preferred that a high power laser pulse and a low power laser pulse are alternately irradiated. Hereinafter, the high power laser pulse will be referred to as a recording pulse, and the power applied will be referred to as recording power Pw. Further, the low power laser pulse will be referred to as an off-pulse, and the power applied will be referred to as bias power Pb.

By alternately irradiating the above-mentioned high power laser pulse and low power laser pulse, a region heated by the recording pulse can be rapidly cooled relatively between the off-pulses, whereby the amorphous phase tends to be formed easily. In order that the rise/fall of pulses rapidly takes place and the laser light source used for recording is available at a low cost, it is preferred that recording can be carried out with a low recording power Pw. However, that recording is possible with a low power means that information is likely to deteriorate by retrieving light. Accordingly, the medium is preferably designed so that the recording power Pw will be from 8 to 25 mW, more preferably from 8 to 20 mW.

The bias power Pb is preferably at most 0.5 time the recording power Pw (Pb/Pw≦0.5), more preferably at most 0.3 time (Pb/Pw≦0.3). Taking tracking performances and the like into consideration, the bias power Pb is preferably in the vicinity of the value of the power Pr of the retrieving light to be irradiated at the time of retrieving. The retrieving power Pr is usually from 0.5 to 1.0 mW.

In order to increase the cooling rate, the bias power Pb is preferably low, and it may be 0. That is, no light may be irradiated.

It is preferred to continuously irradiate laser light with an erasing power Pe to the recording layer at the time of forming the quasi-stable crystal phase. The erasing power Pe is not particularly limited so long as the recording layer can be heated to erase the quasi-stable crystal phase at the time of overwriting. However, it is usually greater than the bias power Pb and smaller than the recording power Pw. For example, 0.2≦Pe/Pw<1.0. When pulses with an erasing power Pe are continuously irradiated, the recording layer is heated to a temperature in the vicinity of the crystallization temperature, and the heated region can be slowly cooled relatively, whereby the quasi-stable crystal phase can be formed.

However, in a case where the second embodiment is utilized as explained in (A) (A-1) (II), i.e. an optical recording medium wherein the recording marks undergo the phase-change from the amorphous phase to the stable crystal phase during storage is used, it is preferred to make the erasing power Pe higher. As the stable crystal marks will not be erased (phase-change to the quasi-stable crystal phase) unless the recording layer is once melted, it is preferred to increase the erasing power Pe to a level at which the recording layer is melted. In such a case, 0.5≦Pe/Pw≦1.0 for example.

By combining the above, it is possible to dividedly form the amorphous phase and the quasi-stable crystal phase, whereby overwriting recording can be carried out.

A specific example wherein a recording pulse and an off-pulse are alternately irradiated at the time of forming the amorphous phase will be shown below. In forming marks (amorphous phase) having a length nT (T represents a reference clock period, and n represents a natural number), a time period nT is divided as in the following mathematical formula (3).

$$\alpha_1 T, \beta_1 T, \alpha_2 T, \beta_2 T, \ldots, \alpha_{m-1} T, \beta_{m-1} T, \alpha_m T, \beta_m T \qquad (3)$$

(where $\alpha_1+\beta_1+\alpha_2+\beta_2+\ldots, \alpha_{m-1}+\beta_{m-1}+\alpha_m+\beta_m$=n−j, and j and m are values determined by a combination of the medium and recording conditions, provided that j is a real number of at least 0, and m is an integer of at least 1)

In the above-mentioned formula, a recording pulse is irradiated in a time of $\alpha_i T (1 \leq i \leq m)$, and an off-pulse is irradiated in a time of $\beta_i T (1 \leq i \leq m)$ for recording. Light having an erasing power Pe is irradiated in a region between marks (quasi-stable crystal phase), whereby overwriting recording can be carried out.

Preferred as the method of recording/erasing on the optical recording medium of the present invention is a recording/erasing method wherein recording/erasing of information signals is carried out on the optical recording medium as explained in the above-mentioned (A) only at a reference clock period T of at most 15 nsec, and for recording a high power laser pulse and a low power laser pulse are alternately irradiated, and said low power laser pulse includes a pulse with a pulse width of at least 0.9T. The pulse width of the low power laser pulse is made to be at least 0.9T since said low power laser pulse is required to be long in order to obtain a sufficient cooling rate, in a case where divided pulse recording is employed in high speed recording with a reference clock period of so short as at most 15 nsec.

EXAMPLES

Now, the present invention will be explained with reference to Examples. However, the present invention is by no means restricted to Examples unless it exceeds its gist.

Examples 1 to 4 and Comparative Examples 1 to 6

On a disc-shape polycarbonate substrate with a diameter of 120 mm and a thickness of 1.2 mm, having guide grooves with a groove width of 0.5 μm, a groove depth of 40 nm and a groove pitch of 1.6 μm, a $(ZnS)_{80}(SiO_2)_{20}$ layer, a Au—Ge—Sb recording layer, a $(ZnS)_{80}(SiO_2)_{20}$ layer and a $Al_{99.5}Ta_{0.5}$ alloy reflective layer were formed by a sputtering method to prepare a phase-change type optical disc.

The layer thickness constitution and the recording layer composition in each of Examples 1 to 4 and Comparative Examples 1 to 6 are shown in Table 1. Further, the values x and y when the composition is represented as $(Au_xSb_{1-x})_{1-y}Ge_y$ are also shown in Table 1. In Table 1, the layer thickness constitution of Example 1 is described as "Sub./100/18/40/200", which means that "the layer thickness of the protective layer i.e. the $(ZnS)_{80}(SiO_2)_{20}$ layer on the substrate (Sub.) is 100 nm, the layer thickness of the Au—Ge—Sb recording layer on the above protective layer is 18 nm, the layer thickness of the protective layer i.e. the $(ZnS)_{80}(SiO_2)_{20}$ layer on the above recording layer is 40 nm, and the layer thickness of the $Al_{99.5}Ta_{0.5}$ alloy reflective layer on the above protective layer is 200 nm". The same applies to the layer thickness constitution of each of Examples 2 to 4 and Comparative Examples 1 to 6.

TABLE 1

|  | Layer thickness constitution (nm) | Composition | x | y | Initialized state | Reflectivity between marks | | Reflectivity of mark part | |
|---|---|---|---|---|---|---|---|---|---|
|  |  |  |  |  |  | Initial | After aging test | Initial | After aging test |
| Ex. 1 | Sub./100/18/40/200 | Au29Ge11Sb60 | 0.33 | 0.11 | Good | 34% | 33% | 20% | 18% |
| Ex. 2 | Sub./100/18/40/200 | Au19Ge13Sb68 | 0.22 | 0.13 | Good | 34% | 27% | 18% | 14% |
| Ex. 3 | Sub./100/18/40/200 | Au9Ge14Sb77 | 0.1 | 0.14 | Good | 27% | 18% | 15% | 10% |
| Ex. 4 | Sub./80/15/30/200 | Au9Ge14Sb77 | 0.1 | 0.14 | Good |  |  |  |  |
| Comp. Ex. 1 | Sub./100/18/40/200 | Au43Ge5Sb52 | 0.45 | 0.05 | Initialization infeasible |  |  |  |  |
| Comp. Ex. 2 | Sub./80/15/30/200 | Au38Ge10Sb52 | 0.42 | 0.1 | Initialization infeasible |  |  |  |  |
| Comp. Ex. 3 | Sub./100/18/40/200 | Au17Ge32Sb51 | 0.25 | 0.32 | Poor |  |  |  |  |
| Comp. Ex. 4 | Sub./80/15/30/200 | Au7Ge36Sb57 | 0.11 | 0.36 | Poor |  |  |  |  |
| Comp. Ex. 5 | Sub./80/15/30/200 | Ge16Sb84 | 0 | 0.16 | Poor |  |  |  |  |
| Comp. Ex. 6 | Sub./80/15/30/200 | Ge17Sb83 | 0 | 0.17 | Poor |  |  |  |  |

Among the obtained discs, the discs of Comparative Examples 1 and 2 had a reflectivity immediately after the disc preparation of 14% and 8%, respectively, and the reflectivity did not change by any DC laser light irradiation with a power of at most 12 mW within a linear velocity range of from 1.2 to 24 m/s. Accordingly, at least within this linear velocity range, the initial crystallization of a phase-change type optical disc could not be achieved, and the discs could not be used as a phase-change type optical disc. This is considered to be because the quasi-stable crystal phase could not exist stably, and a stable crystal phase always existed.

The discs of Comparative Examples 3 and 4 had a reflectivity immediately after the disc preparation of 4% and 4%, respectively, and no uniform increase in the reflectivity was shown by any DC laser light irradiation of at most 12 mW within a linear velocity range of from 1.2 to 24 m/s. Accordingly, at least within this linear velocity range, initial crystallization of a phase-change type optical disc could not be carried out favorably, and the discs could hardly be used as a phase-change type optical disc. This is considered to be because the phase-change speed from the amorphous phase to the quasi-stable crystal phase was low, whereby no uniform quasi-stable phase could be obtained, and the recording layer did not substantially change from the amorphous phase even by the DC laser light irradiation.

With respect to discs of Examples 1 to 3 after initial crystallization, recording/erasing was carried out on the guide grooves, followed by retrieving to evaluate disc properties by using a disc evaluation apparatus having a laser wavelength of 780 nm and a pickup of NA 0.5 in accordance with the following procedure.

Figure 1:
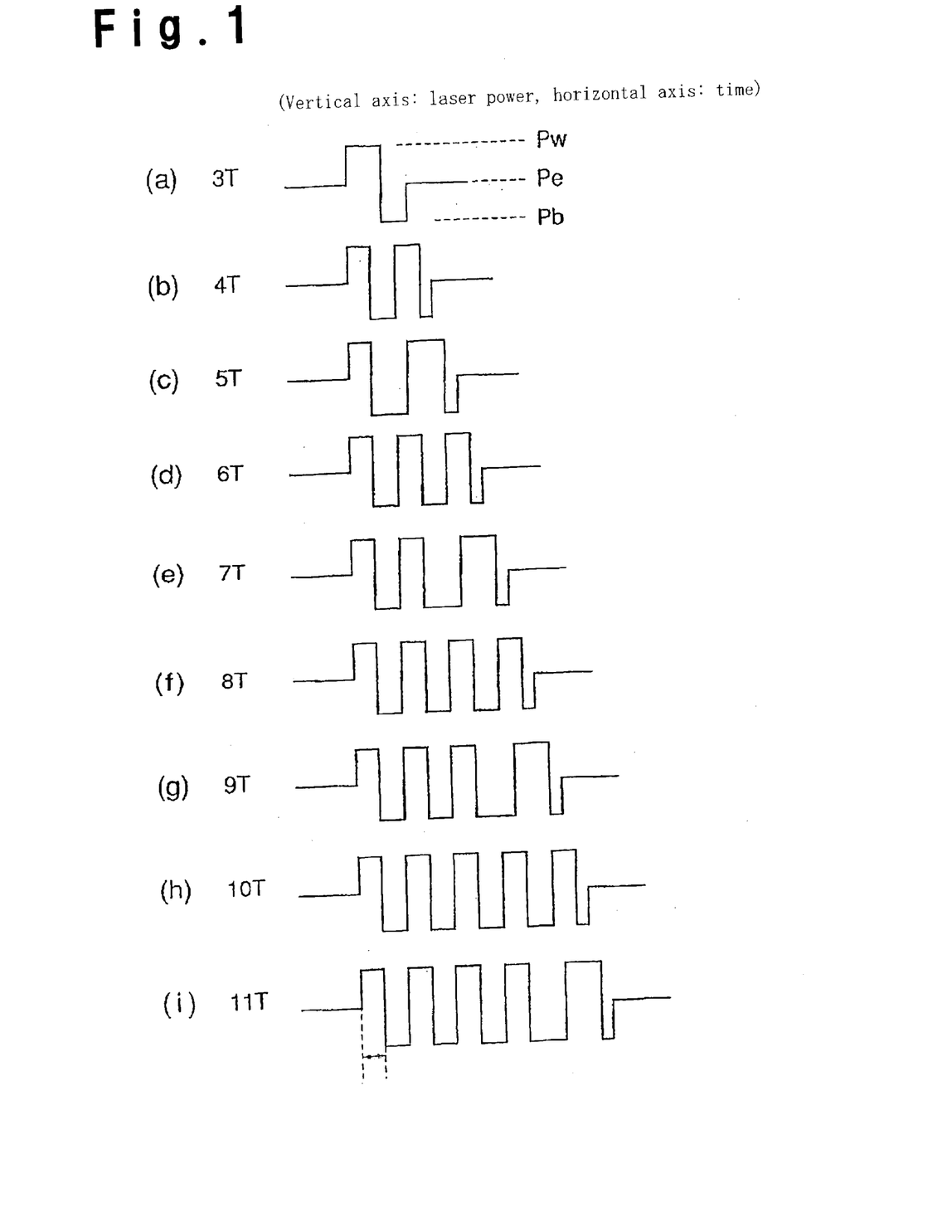
FIG. 1: a schematic view illustrating a divided pulse method in Examples of the present invention.

Firstly, in a linear velocity of 24 m/s, reference clock period T=11.6 ns, Pw=21 mW, Pe=10.5 mW and Pb=0.8 mW, EFM random signals were recorded by employing laser waveforms as shown in FIG. 1.

In forming marks (amorphous phase) having a length nT (T represents a reference clock period, and n represents a natural number of from 3 to 11), a time period nT was divided as in the above-mentioned mathematical formula (3), and a recording pulse having a recording power Pw and an off-pulse having a bias power Pb were alternately irradiated, and a pulse having an erasing power Pe was irradiated in part. Erasing light having an erasing power Pe was irradiated in a region between marks (quasi-stable crystal phase).

Specifically, a series of pulses with Pw and Pb were irradiated as follows at the time of forming marks (T represents a reference clock period).

| | |
|---|---|
| 3T mark part: | Pw for 1.5T, Pb for 1.2T |
| 4T mark part: | Pw for 1T, Pb for 1T, Pw for 1T, Pb for 0.6T |
| 5T mark part: | Pw for 1T, Pb for 1.35T, Pw for 1.5T, Pb for 0.6T |
| 6T mark part: | Pw for 1T, Pb for 1T, Pw for 1T, Pb for 1T, Pw for 1T, Pb for 0.6T |
| 7T mark part: | Pw for 1T, Pb for 1T, Pw for 1T, Pb for 1.35T, Pw for 1.5T, Pb for 0.6T |
| 8T mark part: | Pw for 1T, Pb for 1T, Pw for 1T, Pb for 1T, Pw for 1T, Pb for 1T, Pw for 1T, Pb for 0.6T |
| 9T mark part: | Pw for 1T, Pb for 1T, Pw for 1T, Pb for 1T, Pw for 1T, Pb for 1.35T, Pw for 1.5T, Pb for 0.6T |
| 10T mark part: | Pw for 1T, Pb for 1T, Pw for 1T, Pb for 1T, Pw for 1T, Pb for 1T, Pw for 1T, Pb for 0.6T |
| 11T mark part: | Pw for 1T, Pb for 1T, Pw for 1T, Pb for 1T, Pw for 1T, Pb for 1T, Pw for 1T, Pb for 1.35T, Pw for 1.5T, Pb for 0.6T |

The EFM random signals thus recorded were retrieved at a linear velocity of 2.4 m/s to measure the reflectivity between marks and the reflectivity of mark part. The results are shown in Table 1 as the initial reflectivities. The part between marks corresponds to a non-recorded/erased part, and the mark part corresponds to a recorded part.

Then, the disc was held in an environment of 105° C. for 3 hours (aging test), and the reflectivity between marks and the reflectivity of mark part of the signals recorded as mentioned above were measured again. The results are shown in Table 1 as the reflectivities after aging test.

In Example 1, the initial reflectivity between marks and the reflectivity between marks after aging test were substantially the same, and substantially no decrease in the reflectivity between marks due to the aging test was shown. In Example 2, the decrease in the reflectivity between marks due to the aging test was about 7%. This is considered to be because the recording layer composition of Example 2 had a lower Au content as compared with the recording layer composition of Example 1, whereby storage stability of the quasi-stable phase slightly decreased. However, the above-mentioned decrease in the reflectivity is at an insignificant level in view of practical use level. In Example 3, the decrease in the reflectivity between marks due to the aging test was about 9%. This is considered to be because the recording layer composition of Example 3 had a lower Au content as compared with the recording layer compositions of Examples 1 and 2, whereby storage stability of the quasi-stable phase decreased. However, the above-mentioned decrease in the reflectivity is at an insignificant level in view of practical use level. Accordingly, excellence in the storage stability of the quasi-stable phase decreases in the order of Example 1, Example 2 and Example 3.

Now, the phase state of the recording layer of each of the discs of Examples 1 to 3 will be considered in further detail.

On these discs, in the initial recording/erasing, it was possible to erase the mark part by irradiation with light having an erasing power of 10.5 mW at a linear velocity of 24 m/s, whereas for formation of the mark part, a recording power of at least 17 mW was required. Namely, when the initial mark part and the initial part between marks are referred to as a phase L and a phase M, respectively, a phase-change from the phase L to the phase M may take place at a lower temperature than a phase-change from the phase M to the phase L, and thus the phase M is more stable than the phase L.

On the disc of Example 1, it was possible to erase the mark part on the recording layer by DC laser light irradiation with a power of 5 mW at a linear velocity of 2.4 m/s initially, whereas after the aging test, some part of the mark part on the recording layer was not erased even by carrying out the DC laser light irradiation under the same conditions as mentioned above. This means that when the initial mark part and the initial part between marks are referred to as a phase L and a phase M, respectively, part of the phase L of the marks formed when the signals were recorded underwent a phase-change to a phase N which was neither phase L nor phase M, having a reflectivity at the same level as the phase L, after the aging test at 105° C.

Practically, DC laser light having a power of 5 mW, which was considered to be not so high as to melt the recording layer, was irradiated to said disc at a linear velocity of 2.4 m/s 1000 times, and then retrieving light was irradiated to the disc, and a read signal shape was observed by an oscilloscope, whereupon the above-mentioned part which was not erased (phase N) tended to extend to the part between marks (phase M). This means that the phase M at the part between marks gradually underwent the phase-change to the more stable phase N.

The reflectivity in the phase N recovered to the reflectivity in a non-recorded state by DC laser light irradiation with a power of 10 mW which was considered to melt the recording layer at a linear velocity of 2.4 m/s. It is considered that the phase N underwent the phase-change to the phase M. However, the phase N did not undergo the phase-change to the phase M by DC laser light irradiation of at most 6 mW.

Accordingly, the phase-change from the phase M to the phase N may take place at a lower temperature than the phase-change from the phase N to the phase M, and accordingly the phase N is more stable than the phase M.

On the discs of Examples 2 and 3 also, the reflectivity between marks decreased by irradiation of DC laser light of 5 mW at a linear velocity of 2.4 m/s 1000 times. This is considered to be because the phase M underwent the phase-change to the phase N. The reflectivity at this part recovered to the reflectivity in a non-recorded state by DC laser light irradiation of 10 mW which was considered to melt the recording layer, however, the reflectivity did not recover by DC laser light irradiation of at most 6 mW. Namely, on the discs of Examples 2 and 3 also, the phase-change from the phase M to the phase N may take place at a lower temperature than the phase-change from the phase N to the phase M, and accordingly, it is found that the phase N is more stable than the phase M.

Accordingly, in Examples 1, 2 and 3, the phase M is more stable than the phase L, and the phase N is more stable than the phase M. Accordingly, it is considered that the phase L corresponds to the phase A and in the amorphous phase, the phase M corresponds to the phase B and in the quasi-stable crystal phase, and the phase N corresponds to the phase C and in the stable crystal phase. Further, in the initial erasing/recording, the phase B (phase M, quasi-stable crystal phase) was employed as the non-recorded/erased state, and the phase A (phase L, amorphous phase) was employed as the recorded state. Further, in the discs of Examples 1, 2 and 3, the phase-change between the phase A and the phase B was utilized, whereby recording/erasing at a high linear velocity of 24 m/s was possible.

The reason why the linear velocity was decreased from 24 m/s when the marks were recorded to 2.4 m/s in experiments for detail consideration of the phase conditions of the recording layers of the discs of Examples 1 to 3, is that by decreasing the cooling rate at the time of laser irradiation to increase the time when the temperature raised, the phase-change to the most stable phase N would easily be observed.

Then, by using the disc of Example 4 having the same recording layer composition as in Example 3 and having a slightly different layer thickness constitution, the overwriting jitter properties after initial crystallization were measured.

Firstly, in a linear velocity of 24 m/s, reference clock period T=11.6 ns, Pe/Pw ratio=0.45 and Pb=0.8 mW, EFM random signals were recorded by overwriting 50 times. The recording power was from 17 to 24 mW.

In forming marks (amorphous phase) having a length nT (T represents a reference clock period, and n represents a natural number of from 3 to 11), a time period nT was divided as in the above-mentioned mathematical formula (3), a recording pulse having a recording power Pw and an off-pulse having a bias power Pb were alternately irradiated, and a pulse having an erasing power Pe was irradiated in part. Erasing light having an erasing power Pe was irradiated in a region between marks (quasi-stable crystal phase).

Specifically, a series of pulses of Pw and Pb were irradiated as follows at the time of forming marks (T represents a reference clock period).

| | |
|---|---|
| 3T mark part: | Pw for 1.25T, Pb for 0.7T |
| 4T mark part: | Pw for 1.1T, Pb for 0.85T, Pw for 1T, Pb for 0.2T |
| 5T mark part: | Pw for 1.1T, Pb for 1.25T, Pw for 1.3T, Pb for 0.2T |
| 6T mark part: | Pw for 1.1T, Pb for 0.85T, Pw for 1T, Pb for 0.85T, Pw for 1T, Pb for 0.2T |
| 7T mark part: | Pw for 1.1T, Pb for 1.25T, Pw for 1T, Pb for 1T, Pw for 1.3, Pb for 0.2T |
| 8T mark part: | Pw for 1.1T, Pb for 0.85T, Pw for 1T, Pb for 1T, Pw for 1T, Pb for 0.85T, Pw for 1T, Pb for 0.2T |
| 9T mark part: | Pw for 1.1T, Pb for 1.25T, Pw for 1T, Pb for 1T, Pw for 1T, Pb for 1T, Pw for 1.3T, Pb for 0.2T |
| 10T mark part: | Pw for 1.1T, Pb for 0.85T, Pw for 1T, Pb for 1T, Pw for 1T, Pb for 1T, Pw for 1T, Pb for 0.85T, Pw for 1T, Pb for 0.2T |

-continued

| 11T mark part: | Pw for 1.1T, Pb for 1.25T, Pw for 1T, Pb for 1T, Pw for 1T, Pb for 1T, Pw for 1T, Pb for 1T, Pw for 1.3T, Pb for 0.2T |
|---|---|

Figure 2:
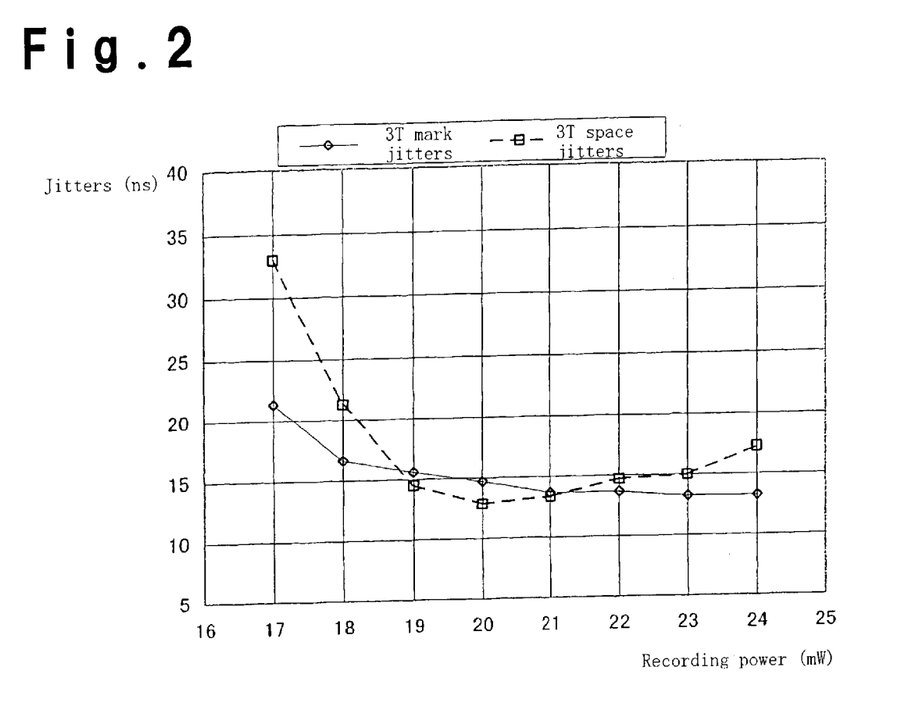
FIG. 2: a graph illustrating the relation of the recording power to 3T mark jitters and 3T space jitters in Examples of the present invention.

The EFM random signals thus recorded were retrieved at a linear velocity of 2.4 m/s to measure 3T mark jitters and 3T space jitters. The results are shown in FIG. 2. Jitters of at most 17.5 ns as the normalization of CD-RW were adequately achieved, and thus it is found that the disc had excellent overwriting jitter properties.

Then, the same measurement was attempted with respect to a GeSb type containing no Au. $Ge_{16}Sb_{84}$ (Comparative Example 5) and $Ge_{17}Sb_{83}$ (Comparative Example 6) which were considered to be compositions suitable for the above-mentioned recording conditions in view of the crystallization speed were employed. However, on each of discs of Comparative Examples 5 and 6, the read signal shape observed by an oscilloscope after initial crystallization was a bold line with a width, with an inconstant reflectivity level in the crystal phase (non-recorded state). This is considered to be because the recording layer was not uniformly crystallized after the initial crystallization. Further, the value of jitters of each of these discs was not at most 25 ns and the signal amplitude was low, and these discs can hardly be said as an usable disc.

Accordingly, an optical recording medium excellent in recording signal storage stability and jitter properties at a high transfer rate overwriting recording can be obtained with a composition of $(Au_xSb_{1-x})_{1-y}Ge_y$ wherein $0.01 \leq x \leq 0.4$ and $0 \leq y \leq 0.3$. Further, a medium particularly excellent in recording signal storage stability can be obtained with the above composition wherein $0.12 \leq x \leq 0.4$ and $0 < y \leq 0.3$.

Examples 5 to 9 and Comparative Examples 7 and 8

On a disc-shape polycarbonate substrate with a diameter of 120 mm and a thickness of 1.2 mm, having guide grooves with a groove width of 0.5 μm, a groove depth of 40 nm and a groove pitch of 1.6 μm, a $(ZnS)_{80}(SiO_2)_{20}$ layer (100 nm), a Au—Ge—Sb—Te recording layer (18 nm), a $(ZnS)_{80}(SiO_2)_{20}$ layer (40 nm) and an $Al_{99.5}Ta_{0.5}$ alloy reflective layer (200 nm) were formed by a sputtering method to prepare a phase-change type optical disc.

Seven types of the recording layer compositions as shown in Table 2 were used. Further, the values x, y and z when these compositions are represented as $((Au_xSb_{1-x})_{1-y}Ge_y)_{1-z}Te_z$ are also shown in Table 2.

Among the obtained discs, the disc of Comparative Example 7 had a reflectivity immediately after the disc preparation of 14%, and the reflectivity did not change by any DC laser light irradiation with a power of at most 12 mW within a linear velocity range of from 1.2 to 24 m/s. Accordingly, at least within this linear velocity range, the initial crystallization of a phase-change type optical disc could not be achieved, and the disc could not be used as a phase-change type optical disc. This is considered to be because the quasi-stable crystal phase could not exist stably, and the recording layer was always in the stable crystal phase.

The disc of Comparative Example 8 had a reflectivity immediately after the disc preparation of 4%, and no uniform increase in the reflectivity was shown by any DC laser light irradiation of at most 12 mW within a linear velocity range of from 1.2 to 24 m/s. Accordingly, at least within this linear velocity range, the initial crystallization of a phase-change type optical disc could not be achieved, and the disc could not be used as a phase-change type optical disc. This is considered to be because the phase-change speed from the amorphous phase to the quasi-stable crystal phase was slow, whereby no uniform quasi-stable phase could be obtained, and the recording layer remained substantially in the amorphous phase.

On the other hand, of the discs of Examples 5 to 9, a uniform increase in the reflectivity was observed by DC laser light irradiation of at most 12 mW within a linear velocity range of from 1.2 to 24 m/s.

With respect to each of the discs of Examples 5 to 9 subjected to initial crystallization, recording/erasing on the guide grooves were carried out, followed by retrieving to evaluate disc properties by using a disc evaluation apparatus having a laser wavelength of 780 nm and a pickup of NA0.5 in accordance with the following procedure.

Firstly, in a linear velocity of 24 m/s, reference clock period T=11.6 ns, Pw=21 mW, Pe=10.5 mW and Pb=0.8 mW, EFM random signals were recorded by employing the laser waveform as shown in FIG. 1.

In FIG. 1, the horizontal axis represents the time and the vertical axis represents the laser power, and three types of powers i.e. recording power Pw, erasing power Pe and bias power Pb are employed. FIG. 1(a) illustrates a laser waveform in a case where marks having a length 3T are recorded, and FIGS. 1(b), (c), (d), (e), (f), (g), (h) and (i) illustrate laser waveforms wherein marks having a length of 4T, 5T, 6T, 7T, 8T, 9T, 10T and 11T are recorded, respectively.

Namely, in forming marks (amorphous phase) having a length nT (T represents a reference clock period, and n

TABLE 2

| | | | | | Reflectivity between marks | | Reflectivity of mark part | |
|---|---|---|---|---|---|---|---|---|
| | Composition | x | y | z | Initial | After aging test | Initial | After aging test |
| Ex. 5 | Au30Ge6Sb59Te5 | 0.34 | 0.06 | 0.05 | 35% | 34% | 21% | 19% |
| Ex. 6 | Au29Ge11Sb60 | 0.33 | 0.11 | 0.00 | 34% | 33% | 20% | 18% |
| Ex. 7 | Au19Ge13Sb68 | 0.22 | 0.13 | 0.00 | 34% | 27% | 18% | 14% |
| Comp. Ex. 7 | Au43Ge5Sb52 | 0.45 | 0.05 | 0.00 | — | — | — | — |
| Comp. Ex. 8 | Au17Ge32Sb51 | 0.25 | 0.32 | 0.00 | — | — | — | — |
| Ex. 8 | Au18Ge4Sb65Te13 | 0.22 | 0.05 | 0.13 | 32% | 30% | 21% | 30% |
| Ex. 9 | Au23Ge3Sb55Te19 | 0.29 | 0.04 | 0.19 | 31% | 32% | 17% | 32% | represents a natural number of from 3 to 11), a time period nT was divided as in the above-mentioned mathematical formula (3), and a recording pulse having a recording power Pw and an off-pulse having a bias power Pb are alternately irradiated, and a pulse having an erasing power Pe was irradiated in part. Erasing light having an erasing power Pe was irradiated in a region between marks (quasi-stable crystal phase).

Particularly, a series of pulses of Pw and Pb were irradiated as follows at the time of forming marks (T represents a reference clock period).

| | |
|---|---|
| 3T mark: | Pw for 1.5T, Pb for 1.2T |
| 4T mark: | Pw for 1T, Pb for 1T, Pw for 1T, Pb for 0.6T |
| 5T mark: | Pw for 1T, Pb for 1.35T, Pw for 1.5T, Pb for 0.6T |
| 6T mark: | Pw for 1T, Pb for 1T, Pw for 1T, Pb for 1T, Pw for 1T, Pb for 0.6T |
| 7T mark: | Pw for 1T, Pb for 1T, Pw for 1T, Pb for 1.35T, Pw for 1.5T, Pb for 0.6T |
| 8T mark: | Pw for 1T, Pb for 1T, Pw for 1T, Pb for 1T, Pw for 1T, Pb for 1T, Pw for 1T, Pb for 0.6T |
| 9T mark: | Pw for 1T, Pb for 1T, Pw for 1T, Pb for 1T, Pw for 1T, Pb for 1.35T, Pw for 1.5T, Pb for 0.6T |
| 10T mark: | Pw for 1T, Pb for 1T, Pw for 1T, Pb for 1T, Pw for 1T, Pb for 1T, Pw for 1T, Pb for 1T, Pw for 1T, Pb for 0.6T |
| 11T mark: | Pw for 1T, Pb for 1T, Pw for 1T, Pb for 1T, Pw for 1T, Pb for 1T, Pw for 1T, Pb for 1.35T, Pw for 1.5T, Pb for 0.6T |

The EFM random signals thus recorded were retrieved at a linear velocity of 2.4 m/s to measure the reflectivity between marks and the reflectivity of mark part. The results are shown in Table 2 as the initial reflectivities. The part between marks corresponds to a non-recorded/erased part, and the mark part corresponds to the recorded part.

In the initial conditions in Examples 5 to 9, it is estimated that the part between marks (non-recorded/erased part) was in the quasi-stable phase, and the mark part (recorded part) was in the amorphous phase. Further, since there is only one type of the amorphous phase and the others are crystal phases in general, it is estimated that the quasi-stable phase was a quasi-stable crystal phase.

Then, each of the discs was held in an environment of 105° C. for 3 hours (aging test), and the reflectivity between marks and the reflectivity of mark part of the signals recorded as mentioned above were measured again. The results are shown in Table 2 as the reflectivities after aging test.

With respect to the discs of Examples 5 and 6, the reflectivity between marks after the aging test did not substantially decrease from the initial reflectivity, and it was found that these discs had good performances as a phase-change type optical disc. Further, of the disc of Example 7, the decreasing rate of the reflectivity between marks after the aging test was about 7%. This is considered to be because the amount of Au contained in the recording layer of the optical disc of Example 7 was small as compared with the discs of Examples 5 and 6, whereby storage stability of the quasi-stable phase slightly decreased. However, the above-mentioned decrease in the reflectivity is at an insignificant level in view of practical use level.

With respect to the discs of Examples 8 and 9, no decrease in the reflectivity between marks was shown, and good storage stability was shown. On the other hand, at the mark part, the reflectivity slightly increased after the above-mentioned aging test. This is considered to be because the amorphous marks underwent a phase-change to the quasi-stable phase in a non-recorded state by the aging test.

Now, the phase conditions of the recording layers in Examples 5 to 7 will be considered in further detail.

On these discs, in the initial recording/erasing, it was possible to erase the mark part by light irradiation with an erasing power of 10.5 mW at a linear velocity of 24 m/s, whereas for formation of the mark part, a recording power of at least 17 mW was required. Namely, when the initial mark part and the initial part between marks are referred to as a phase L and a phase M, respectively, a phase change from the phase L to the phase M may take place at a lower temperature than a phase-change from the phase M to the phase L, and thus, the phase M is more stable than the phase L.

In Examples 5 and 6, it was possible to erase the mark part by DC laser light irradiation with a power of 5 mW at a linear velocity of 2.4 m/s initially, whereas after the aging test, some part of the mark part could not be erased under the same conditions. Namely, when the initial mark part and the initial part between marks are referred to as a phase L and a phase M, respectively, part of the phase L of the marks formed when the signals were recorded underwent a phase-change to a phase N which was neither the phase L nor the phase M, having a reflectivity at the same level as the phase L, after the aging test at 105° C.

Practically, DC laser light with a power of 5 mW, which was considered not to melt the recording layer by irradiation, was irradiated to said disc at a linear velocity of 2.4 m/s 1000 times, and then retrieving light was irradiated to the disc, and a read signal shape was observed by an oscilloscope, whereupon the above-mentioned part which was not erased (phase N) tended to extend to the part between marks (phase M). This means that the phase M at the part between marks gradually underwent the phase-change to the more stable phase N.

The region to be in the phase N was observed in a larger area in the disc of Example 6 than the disc of Example 5. Further, the reflectivity in the phase N recovered to the reflectivity in a non-recorded state by DC laser light irradiation with a power of 10 mW, which was considered to melt the recording layer, at a linear velocity of 2.4 m/s. It is considered that the phase N underwent the phase-change to the phase M. However, the phase N did not undergo the phase-change to the phase M by DC laser light irradiation of at most 6 mW.

As mentioned above, the phase-change from the phase M to the phase N may take place at a lower temperature than the phase-change from the phase N to the phase M, and accordingly the phase N is more stable than the phase M.

With respect to the disc of Example 7 also, the reflectivity between marks decreased by irradiation of DC laser light of 5 mW at a linear velocity of 2.4 m/s 1000 times. It is considered that the phase M underwent the phase-change to the phase N. The reflectivity of this part recovered to the reflectivity in a non-recorded state by DC laser light irradiation of 10 mW, which was considered to melt the recording layer, however, it did not recover to the reflectivity in a non-recorded state by DC laser light irradiation of at most 6 mW. As the phase-change from the phase M to the phase N may take place at a lower temperature than the phase-change from the phase N to the phase M, the phase N is more stable than the phase M.

As mentioned above, in each of the discs of Examples 5 to 7, it is considered that the phase L corresponds to the amorphous phase, the phase M corresponds to the quasi-stable phase (quasi-stable crystal phase), and the phase N corresponds to the stable phase (stable crystal phase).

Here, in experiments for detail consideration of the phase conditions of the recording layers of the discs of Examples 5 to 7, the reason why the linear velocity was decreased from 24 m/s when the marks were recorded to 2.4 m/s is that by decreasing the cooling rate at the time of laser irradiation to increase the time when the temperature raised, the phase-change to the most stable phase N would easily be observed.

Examples 10 to 13 and Comparative Examples 9 to 11

On a disc-shape polycarbonate substrate with a diameter of 120 mm and a thickness of 1.2 mm, having guide grooves with a guide width of 0.5 $\mu$m, a guide depth of 40 nm and a guide pitch of 1.6 $\mu$m, a $(ZnS)_{80}$ $(SiO_2)_{20}$ layer (80 nm), a Au—Ge—Sb—Sn recording layer (15 nm), a $(ZnS)_{80}$ $(SiO_2)_{20}$ layer (30 nm) and an $Al_{99.5}Ta_{0.5}$ alloy reflective layer (200 nm) were formed by a sputtering method to prepare a phase-change type optical disc.

The recording layer compositions are shown in Table 3. Further, the values x, y and z when these compositions are represented as $((Au_xSb_{1-x})_{1-y}Ge_y)_{1-z}Sn_z$ are also shown in Table 3.

It was attempted to subject these discs to initial crystallization by irradiation of DC laser light of 10 mW at 2.4 m/s by using a disc evaluation apparatus having a laser wavelength of 780 nm and a pickup of NA0.5.

With respect to the disc of Comparative Example 11 among the obtained discs, no uniform increase in the reflectivity by the above initialization operation was shown. Further, the reflectivity of the disc after the initialization operation was so low as 7%. That is, the initial crystallization of the recording layer could not be achieved. Accordingly, the disc could hardly be used as a phase-change type optical disc. This is considered to be because no uniform quasi-stable phase could be obtained since the phase-change speed from the amorphous phase to the quasi-stable crystal phase was low, or a structure such as the quasi-stable phase of the Au—Sb type could not exist stably.

The disc of Comparative Example 10 had a reflectivity immediately after the disc preparation of 10%, and no change in the reflectivity by the above initialization operation was shown. Namely, the initial crystallization of the recording layer could not be achieved. Accordingly, with this composition, the disc could not be used as a phase-change type optical disc. This is considered to be because the quasi-stable crystal phase could not exist stably, and the recording layer was always in the stable crystal phase.

With respect to the disc of Comparative Example 9, no uniform increase in the reflectivity by the above initialization operation was shown. Accordingly, with this composition, the initial crystallization of the phase-change type optical disc could not be achieved favorably, and the disc could hardly be used as a phase-change type optical disc. Although the recording layer of this disc crystallized by the initialization operation, the read signal shape of this disc as observed by an oscilloscope was a bold line with a width, with an inconstant reflectivity level of the crystal phase. This is because no uniform crystallization was achieved. The reason why no uniform crystallization was achieved is considered to be because the Au—Sb type quasi-stable phase was not formed.

Of each of the discs of Examples 10 to 13, the recording layer underwent uniform initial crystallization by the initialization operation. Namely, a favorable phase-change type optical disc as compared with the discs of the above-mentioned Comparative Examples 9 to 11 could be obtained. Further, each of the discs of Examples 10 to 13 had a reflectivity in an as-deposited amorphous state of at most 6%, and the difference with the reflectivity in a crystal state was favorable.

Each of the discs of Examples 10 to 13 after the above-mentioned measurement was held in an environment of 105° C. (aging test), to measure the reflectivity at the initially crystallized part and the reflectivity of as-deposited part again. The results are shown in Table 3. Further, the decreasing rate of reflectivity as defined as ((reflectivity of initially crystallized part)−(reflectivity of crystallized part after aging test))/(reflectivity of initially crystallized part) is also shown. It is found that the decreasing rate of reflectivity decreases with an increase in the Sn content.

TABLE 3

|  | Au (at. %) | Sb (at. %) | Ge (at. %) | Sn (at. %) | x | y | z | Reflectivity of crystallized part | Reflectivity of crystallized part after aging test | Decreasing rate of reflectivity | Reflectivity of as-deposited part | Reflectivity of as-deposited part after aging test | Uniformity in reflectivity of crystallized part |
|---|---|---|---|---|---|---|---|---|---|---|---|---|---|
| Ex. 10 | 9 | 65 | 26 | 0 | 0.12 | 0.26 | 0.00 | 24% | 14% | 40% | <6% | <6% | Good |
| Ex. 11 | 8 | 55 | 22 | 15 | 0.13 | 0.26 | 0.15 | 23% | 16% | 28% | <6% | <6% | Good |
| Ex. 12 | 7 | 45 | 19 | 29 | 0.13 | 0.27 | 0.29 | 23% | 19% | 15% | <6% | <6% | Good |
| Ex. 13 | 6 | 39 | 16 | 39 | 0.13 | 0.26 | 0.39 | 23% | 21% | 8% | <6% | <6% | Good |
| Comp. Ex. 9 | 0 | 69 | 0 | 31 | 0.00 | 0.00 | 0.31 | 14% |  |  |  |  | Poor |
| Comp. Ex. 10 | 34 | 45 | 0 | 21 | 0.43 | 0.00 | 0.21 |  |  |  | 10% |  | No change in reflectivity |
| Comp. Ex. 11 | 4 | 27 | 44 | 25 | 0.13 | 0.59 | 0.25 | 7% |  |  |  |  | Poor |

Examples 14 to 18 and Comparative Examples 12 to 16

On a disc-shape polycarbonate substrate with a diameter of 120 mm and a thickness of 1.2 mm, having guide grooves with a groove width of 0.5 $\mu$m, a groove depth of 40 nm and a groove pitch of 1.6 $\mu$m, a $(ZnS)_{80}(SiO_2)_{20}$ layer (100 nm), a Au—Sb—Ge—In recording layer (18 nm), a $(ZnS)_{80}$ $(SiO_2)_{20}$ layer (40 nm) and an $Al_{99.5}Ta_{0.5}$ alloy reflective layer (200 nm) were formed by a sputtering method, and an ultraviolet-curing resin layer was further formed thereon to prepare a phase-change type optical disc.

Here, ten types of the recording layer compositions as shown in Table 4 were used. Further, the values x, y and z when these compositions are represented as $((Au_xSb_{1-x})_{1-y}Ge_y)_{1-z}In_z$ are also shown in Table 4.

As shown in Table 4, the decreasing rates of reflectivity by the laser irradiation test of the discs of Examples 14 to 18 were smaller than those of discs of Comparative Examples 12 to 16. Of all the discs of Comparative Examples, the

TABLE 4

|  | Au (at. %) | Sb (at. %) | Ge (at. %) | In (at. %) | x | y | z | Initial reflectivity | Reflectivity after laser irradiation test | Decreasing rate of reflectivity |
|---|---|---|---|---|---|---|---|---|---|---|
| Ex. 14 | 2 | 65 | 4 | 29 | 0.03 | 0.06 | 0.29 | 32% | 16% | 49% |
| Ex. 15 | 6 | 62 | 4 | 28 | 0.09 | 0.06 | 0.28 | 32% | 25% | 23% |
| Ex. 16 | 10 | 60 | 4 | 26 | 0.14 | 0.05 | 0.26 | 33% | 26% | 21% |
| Ex. 17 | 15 | 57 | 3 | 25 | 0.21 | 0.04 | 0.25 | 33% | 27% | 20% |
| Ex. 18 | 33 | 62 | 5 | 0 | 0.35 | 0.05 | 0.00 | 35% | 16% | 55% |
| Comp. Ex. 12 | 0 | 65 | 4 | 31 | 0.00 | 0.06 | 0.31 | 30% | 9% | 69% |
| Comp. Ex. 13 | 0 | 76 | 4 | 20 | 0.00 | 0.05 | 0.20 | 32% | 14% | 57% |
| Comp. Ex. 14 | 0 | 74 | 0 | 26 | 0.00 | 0.00 | 0.26 | 33% | 9% | 73% |
| Comp. Ex. 15 | 0 | 69 | 0 | 31 | 0.00 | 0.00 | 0.31 | 31% | 6% | 80% |
| Comp. Ex. 16 | 0 | 61 | 0 | 39 | 0.00 | 0.00 | 0.39 | 23% | | |

Initial crystallization of each disc could be achieved favorably. After the initial crystallization, a laser irradiation test of irradiating DC laser light to the guide grooves through the substrate was carried out in accordance with the following procedure, by using an optical disc evaluation apparatus having a laser wavelength of 780 nm and a pickup of NA0.5.

The laser irradiation test is a test wherein DC light of 10 mW are irradiated 100 times, DC light of 9 mW 100 times, DC light of 8 mW 100 times, DC light of 7 mW 100 times, DC light of 6 mW 100 times, DC light of 5 mW 100 times, DC light of 4 mW 100 times and DC light of 3 mW 100 times, in this order at a linear velocity of 2.4 m/s. The reflectivities before and after the laser irradiation test were measured to measure the decrease in the reflectivity. The results are shown in Table 4. The decreasing rate of reflectivity was defined as ((initial reflectivity)−(reflectivity after laser irradiation test))/(initial reflectivity).

The laser irradiation test makes a situation in which when a phase which is more stable than the initial crystallization state exists, the phase-change to the stable phase is likely to take place. The reason is as follows. Namely, when a plurality of phases exists at room temperature, all the phases tend to undergo a phase-change to the most stable phase, and the phase-change speed tends to be high by increasing the temperature appropriately. When DC light of 10 mW is irradiated, the track center portion is melted, however, the intensity of the laser beam decreases as the distance from the beam center increases, and accordingly a temperature range in which the phase-change speed to the stable phase becomes relatively high is achieved at a position distant from the track center to a certain extent. DC light irradiation is carried out 100 times to increase the accumulated time in which this temperature is kept. Then, when the laser power is 9 mW, the position at which a temperature range in which the phase-change speed to the stable phase becomes relatively high is achieved is slightly closer to the track center than that when the laser power is 10 mW. At this time, the portion which changed to the stable phase by DC light irradiation of 10 mW remains as the stable phase. It is considered that by gradually decreasing the power of DC light in such a manner, the region which becomes the stable phase broadens.

decreasing rate of reflectivity by the laser irradiation test was so high as exceeding 55%. This means that the recording layer of each of discs of Comparative Examples 12 to 16 is likely to undergo a phase-change to a crystal phase which is more stable than the initial crystal phase, which is not used for recording/erasing, as compared with the recording layer of each of discs of Examples 14 to 18. In Table 4, no data on the reflectivity of the disc of Comparative Example 16 is shown in the columns "reflectivity after laser irradiation test" and "decreasing rate of reflectivity". This is because the reflectivity after the laser irradiation test was so low that retrieving could not be carried out, regarding the disc of Comparative Example 16.

With respect to the discs of Examples 14 to 18, the decrease in the reflectivity is apparently suppressed, and it is found that the phase-change to the stable crystal phase is less likely to take place. Particularly by comparison between the results of the disc of Example 18 and the results of the discs of Examples 14 to 17, it is found that when the recording layer composition is a composition having Ge, further In, incorporated into a Au—Sb type alloy, the phase-change to the stable crystal phase is still less likely to take place.

The discs of Comparative Examples 12 to 16 and the discs of Comparative Examples 5, 6 and 9 are in common in that the recording layer contains no Au, however, the discs of Comparative Examples 12 to 16 are more excellent than the discs of Comparative Examples 5, 6 and 9 in that the initial crystallization of the disc can be carried out favorably. This means that even with a recoding layer composition containing no Au, by controlling the contents of Sb, Ge and In, a disc of which the initial crystallization is possible can be obtained. However, even in each of the discs of Comparative Examples 12 to 16 of which the initial crystallization can be carried out favorably, since the recording layer of the disc contains no Au, the phase-change to the stable crystal phase is likely to take place by the laser irradiation test, and as a result, the decrease in the reflectivity of the recording layer tends to be significant.

On the other hand, it is essential that the recording layer of the optical recording medium of the present invention contains Au in a predetermined amount. This is because the recording layer contains Au in a predetermined amount, and for this reason, the quasi-stable crystal exists stably, and the phase-change to the stable crystal phase is suppressed, as explained above. This is clear also from the results of the laser irradiation test of each of the discs of the above-mentioned Examples 14 to 18.

Further, on each of the discs of Examples 14 to 18 and Comparative Examples 12 to 16, no change in the reflectivity was shown by irradiation of laser of at most 5 mW after the laser irradiation test, however, the reflectivity substantially recovered to the initial reflectivity by irradiation of DC light of 10 mW once. This is considered to be because the recording layer is not melted by laser of at most 5 mW, however, the recording layer is melted by DC light irradiation of 10 mW, and undergoes the phase-change to a crystal phase corresponding to the quasi-stable phase. From the results of Comparative Examples 12 to 16 as shown in Table 4, it is found that the reflectivity tends to significantly decrease and the phase-change to the stable crystal phase tends to take place when the amount of In is large in the content ratio of In and Sb, in a case where the In—Sb—Ge type alloy is used for the recording layer and in a case where the In—Sb type alloy is used for the recording layer.

Then, EFM random signals were recorded by overwriting ten times on the initially crystallized part of the disc of Example 15 at a recording linear velocity of 24 m/s, and then 3T mark jitters were measured at a linear velocity of 2.4 m/s. At the time of recording, the EFM random signals were in the laser waveforms as shown in FIG. 1, in a reference clock period T=11.6 ns, Pw=22 mW, Pe=7 mW and Pb=0.8 mW.

Namely, in forming marks (amorphous phase) having a length nT (T represents a reference clock period, and n represents a natural number of from 3 to 11), a time period nT was divided as in the above-mentioned mathematical formula (3), and a recording pulse having a recording power Pw and an off-pulse having a bias power Pb were alternately irradiated, and a pulse having an erasing power Pe was irradiated in part. Erasing light having an erasing power Pe was irradiated in a region between marks (crystal phase).

Specifically, a series of pulses of Pw and Pb were irradiated as follows at the time of forming marks (T represents a reference clock period).

| | |
|---|---|
| 3T mark part: | Pw for 1.5T, Pb for 1.2T |
| 4T mark part: | Pw for 1T, Pb for 1T, Pw for 1T, Pb for 0.6T |
| 5T mark part: | Pw for 1T, Pb for 1.35T, Pw for 1.5T, Pb for 0.6T |
| 6T mark part: | Pw for 1T, Pb for 1T, Pw for 1T, Pb for 1T, Pw for 1T, Pb for 0.6T |
| 7T mark part: | Pw for 1T, Pb for 1T, Pw for 1T, Pb for 1.35T, Pw for 1.5T, Pb for 0.6T |
| 8T mark part: | Pw for 1T, Pb for 1T, Pw for 1T, Pb for 1T, Pw for 1T, Pb for 1T, Pw for 1T, Pb for 0.6T |
| 9T mark part: | Pw for 1T, Pb for 1T, Pw for 1T, Pb for 1T, Pw for 1T, Pb for 1.35T, Pw for 1.5T, Pb for 0.6T |
| 10T mark part: | Pw for 1T, Pb for 1T, Pw for 1T, Pb for 1T, Pw for 1T, Pb for 1T, Pw for 1T, Pb for 1T, Pw for 1T, Pb for 0.6T |
| 11T mark part: | Pw for 1T, Pb for 1T, Pw for 1T, Pb for 1T, Pw for 1T, Pb for 1T, Pw for 1.35T, Pw for 1.5T, Pb for 0.6T |

The EFM random signals recorded by overwriting ten times as mentioned above, were retrieved at a linear velocity of 2.4 m/s to measure 3T mark jitters, whereupon they were 17.4 ns. Namely, the CD-RW normalization (orange book part 3) of at most 17.5 ns was met. With respect to the disc of Example 15, further improvement in recording properties can be expected by slightly changing the recording layer composition to change the crystallization speed, by improvement of the pulse strategy at the time of recording, etc. The reason why the recording properties were evaluated with respect to the disc of Example 15 alone is that the disc of Example 15 exhibited the crystallization speed relatively suitable for the above-mentioned recording conditions. It is considered that the discs of the other Examples had a composition suitable for different recording conditions.

The crystallization speed decreased when the content of Ge, In or Au was increased. Accordingly, by decreasing the In content and increasing the Ge content, for example, it is possible to obtain a recording layer having the same level of crystallization speed and having a different composition.

Such a phenomenon that in the non-recorded state of the disc, after retrieving light is irradiated, the read signal shape as observed by an oscilloscope is a bold line with a width, with an inconstant reflectivity level of the crystal phase (non-recorded state), as shown in a case of e.g. $Ge_5Sb_{79}Te_{16}$ which is a conventionally known recording layer composition, was not observed in the disc of Example 15, and it was found that a favorable disc with small noises was obtained.

INDUSTRIAL APPLICABILITY

According to the present invention, an optical recording medium with which the phase-change speed is high, on which a high speed recording/erasing is possible, and which has high storage stability, can be obtained. Particularly, an optical recording medium excellent in storage stability at a recorded part (mark part) and a non-recorded/erased part (part between marks) and jitter properties at a high transfer rate overwriting recording can be obtained.

The present invention has been described in detail with reference to specific embodiments, but it is obvious for the person skilled in the art that various changes and modifications are possible without departing from the intention and the scope of the present invention.

The present invention is based on a Japanese Patent Application filed on Mar. 6, 2001 (JP-2001-062326) and a Japanese Patent Application filed on Nov. 26, 2001 (JP-2001-358898), and the entirety is referred by a citation.

What is claimed is:

1. An optical recording medium comprising a substrate and a phase-change type recording layer which has at least two phases provided on the substrate, wherein the phase-change type recording layer has a composition represented by the following formula (1) as the main component:

$$(Au_xSb_{1-x})_{1-y}Ge_y \qquad (1)$$

where x and y are numbers which satisfy $0.01 \leq x \leq 0.4$ and $0 < y \leq 0.3$.

2. The optical recording medium according to claim 1, wherein the composition is further represented by the following formula (2) as the main component:

$$((Au_xSb_{1-x})_{1-y}Ge_y)_{1-z}M2_z \qquad (2)$$

where x, y and z are numbers which satisfy $0.01 \leq x \leq 0.4$, $0 < y \leq 0.3$ and $0 \leq z \leq 0.4$, and the element M2 is at least one element selected from Te, In and Sn.

3. The optical recording medium according to claim 1, wherein recording/erasing of recording signals is carried out only at a reference clock period T of at most 15 nsec.

4. The optical recording medium according to claim 1, wherein recording/erasing of information signals is carried out only at a reference clock period T of at most 15 nsec, and for recording, a high power laser pulse and a low power laser pulse are alternately irradiated, and said low power laser pulse includes a pulse with a pulse width of at least 0.9T.

5. A method of recording/erasing on the optical recording medium as defined in claim 1, in which the two different phases of said phase-change type recording layer are utilized as a recorded state and a non-recorded/erased state, respectively, wherein said phase-change type recording layer may have at least three phases of a phase A, a phase B and a phase C, and when the phase B is more stable than the phase A and the phase C is more stable than the phase B, said phase B is utilized as the recorded state or the non-recorded/erased state.

6. The recording/erasing method according to claim 5, wherein at least the phase A is utilized as the recorded state and the phase B is utilized as the non-recorded/erased state, or the phase A is utilized as the non-recorded/erased state and the phase B is utilized as the recorded state.

7. A method of recording/erasing information signals on the optical recording medium as defined in claim 1 only at a reference clock period T of at most 15 nsec, wherein for recording, a high power laser pulse and a low power laser pulse are alternately irradiated, and said low power laser pulse includes a pulse with a pulse width of at least 0.9T.

\* \* \* \* \*